United States Patent
Mackenzie et al.

(10) Patent No.: US 11,993,140 B2
(45) Date of Patent: May 28, 2024

(54) LOAD TRANSFERRING BATTERY CELL ARRANGEMENT FOR TRACTION BATTERY PACK

(71) Applicant: Ford Global Technologies, LLC, Dearborn, MI (US)

(72) Inventors: Kevin Mackenzie, Canton, MI (US); Jude Berthault, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 17/211,252

(22) Filed: Mar. 24, 2021

(65) Prior Publication Data

US 2022/0305895 A1  Sep. 29, 2022

(51) Int. Cl.
| | |
|---|---|
| *B60K 1/04* | (2019.01) |
| *H01M 50/119* | (2021.01) |
| *H01M 50/213* | (2021.01) |
| *H01M 50/249* | (2021.01) |
| *H01M 50/264* | (2021.01) |

(52) U.S. Cl.
CPC ............. *B60K 1/04* (2013.01); *H01M 50/119* (2021.01); *H01M 50/213* (2021.01); *H01M 50/249* (2021.01); *H01M 50/264* (2021.01); *H01M 2220/20* (2013.01)

(58) Field of Classification Search
CPC ..... B60K 1/04; H01M 50/119; H01M 50/213; H01M 50/249; H01M 50/264; H01M 2220/20
See application file for complete search history.

(56) References Cited

U.S. PATENT DOCUMENTS

| | | | |
|---|---|---|---|
| 7,531,270 B2 | 5/2009 | Buck et al. | |
| 10,158,106 B2 * | 12/2018 | Marpu | B60K 6/28 |
| 10,680,217 B2 | 6/2020 | Morimitsu et al. | |
| 11,059,363 B2 * | 7/2021 | Kober | B60K 1/04 |
| 11,139,515 B2 * | 10/2021 | Yang | H01M 10/6553 |
| 11,322,805 B2 * | 5/2022 | Motohashi | H01M 50/172 |
| 2010/0291428 A1 * | 11/2010 | Graban | H01M 10/613 |
| | | | 429/120 |
| 2016/0006008 A1 * | 1/2016 | Volz | H01M 50/249 |
| | | | 429/61 |
| 2017/0305249 A1 * | 10/2017 | Hara | B62D 25/2036 |
| 2019/0047419 A1 * | 2/2019 | Kellner | B60K 1/04 |
| 2020/0406737 A1 * | 12/2020 | Abdyli | B60K 1/04 |

FOREIGN PATENT DOCUMENTS

JP  201606645  4/2016

* cited by examiner

*Primary Examiner* — Jason D Shanske
*Assistant Examiner* — James J Triggs
(74) *Attorney, Agent, or Firm* — David B. Kelley; Carlson, Gaskey & Olds, P.C.

(57) ABSTRACT

A traction battery assembly includes, among other things, battery cells configured to be positioned between a first frame rail of an electrified vehicle and an opposite, second frame rail of the electrified vehicle. The battery cells are arranged to transfer a load from the first frame rail to the second frame rail. A method of securing battery cells includes, among other things, positioning battery cells between a first frame of an electrified vehicle and an opposite, second frame rail of the electrified vehicle. The battery cells are positioned to transfer a load from the first frame rail to the second frame rail.

17 Claims, 3 Drawing Sheets

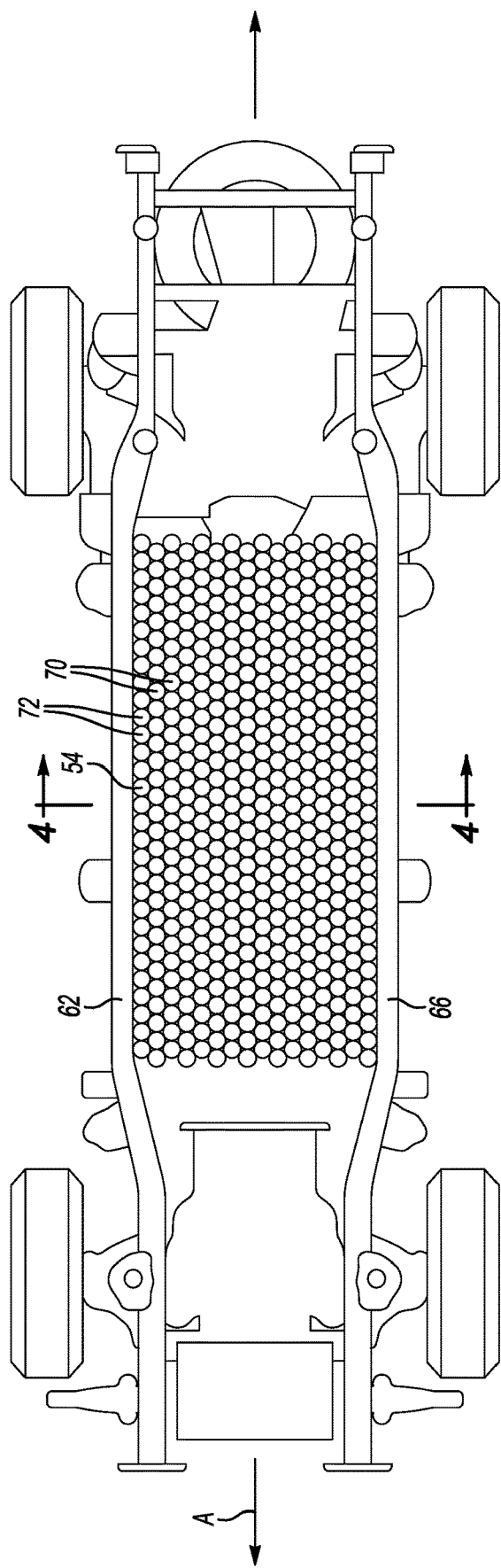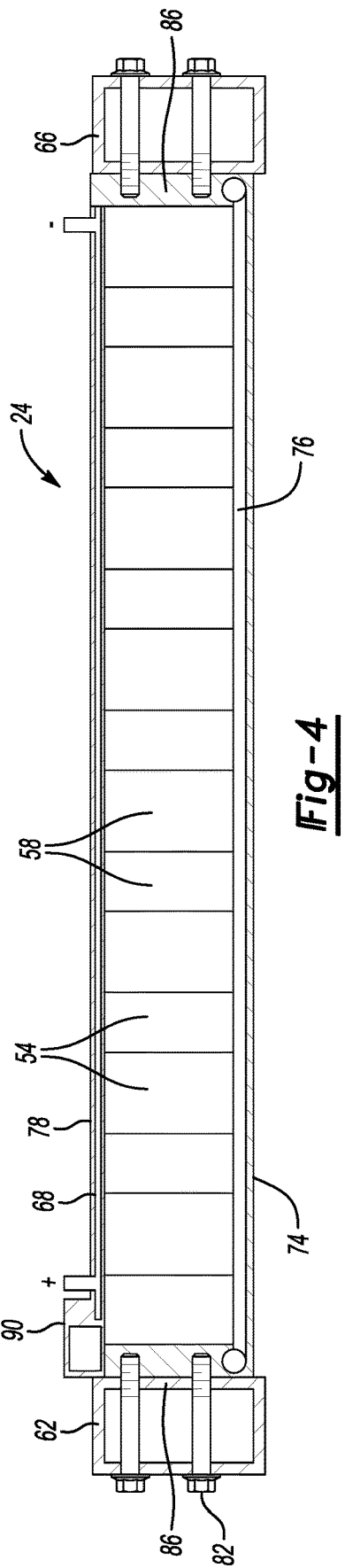

LOAD TRANSFERRING BATTERY CELL ARRANGEMENT FOR TRACTION BATTERY PACK

TECHNICAL FIELD

This disclosure relates generally to a traction battery pack and, more particularly, to a traction battery pack having battery cells arranged to transfer a load.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. A traction battery pack of an electrified vehicle includes a plurality of battery cells that are typically held within an enclosure.

SUMMARY

A traction battery assembly according to an exemplary aspect of the present disclosure includes, among other things, battery cells configured to be positioned between a first frame rail of an electrified vehicle and an opposite, second frame rail of the electrified vehicle. The battery cells are arranged to transfer a load from the first frame rail to the second frame rail.

In an exemplary embodiment of the foregoing assembly, the battery cells are cylindrical battery cells.

In another exemplary embodiment of any of the foregoing assemblies, each of the battery cells includes an outer case, and the outer case of each battery cell is directly secured to an outer case of another battery cell.

In another exemplary embodiment of any of the foregoing assemblies, the battery cells include inner battery cells and peripheral battery cells. The inner battery cells have outer cases that are directly joined to the outer cases of at least two other battery cells.

In another exemplary embodiment of any of the foregoing assemblies, the battery cells are cylindrical battery cells.

In another exemplary embodiment of any of the foregoing battery assemblies, the outer cases are metal or metal alloy.

In another exemplary embodiment of any of the foregoing assemblies, the inner battery cells have outer cases that are directly secured to the outer cases of six other battery cells.

In another exemplary embodiment of any of the foregoing assemblies, each battery cell within the plurality of battery cells includes an outer case. The outer case of each battery cell within the plurality of battery cells is welded to at least one outer case of another battery cell within the plurality of battery cells.

In another exemplary embodiment of any of the foregoing assemblies, each battery cell includes an outer case, and the outer case of each battery cell is directly secured to at least one outer case of another battery cell.

Another exemplary embodiment of any of the foregoing assemblies includes a frame assembly having a plurality of apertures. The frame spans from the first rail to the second rail. Each of the apertures within a plurality of apertures holds one of the battery cells.

In another exemplary embodiment of any of the foregoing assemblies, the frame assembly includes a sheet of material.

The apertures extend from an upper side of the sheet of material to an opposite lower surface of the sheet of material.

In another exemplary embodiment of any of the foregoing assemblies, the frame assembly includes an upper plate and a lower plate that is spaced a distance from the other plate. The apertures are provided by pockets in the upper plate and pockets in the lower plate.

In another exemplary embodiment of any of the foregoing traction battery assemblies, the battery cells are cylindrical battery cells.

In another exemplary embodiment of any of the foregoing traction battery assemblies, the first frame is a passenger side frame and the second frame is a driver side frame.

In another exemplary embodiment of any of the foregoing traction battery assemblies, the passenger side frame is secured relative to the driver side frame without any frame cross-member that overlaps with any of the battery cells along a longitudinal axis of the electrified vehicle.

A method of securing battery cells according to another exemplary aspect of the present disclosure includes, among other things, positioning battery cells between a first frame of an electrified vehicle and an opposite, second frame rail of the electrified vehicle. The battery cells are positioned to transfer a load from the first frame rail to the second frame rail.

In another exemplary embodiment of the foregoing method, the battery cells are cylindrical battery cells.

In another exemplary embodiment of any of the foregoing methods, the battery cells are directly secured to one another.

In another exemplary embodiment of any of the foregoing methods, the battery cells are welded to each other.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 illustrates a top view of a traction battery pack from the powertrain of FIG. 1 along with frame rails of the electrified vehicle.

FIG. 4 illustrates a section view at line 4-4 in FIG. 3.

DETAILED DESCRIPTION

This disclosure details features of a traction battery pack and, more particularly, features relating to how the battery cells are arranged and connected. In an example, the battery cells are arranged so that the battery cells can transfer forces between opposing rails of the electrified vehicle. The forces could be the result of a load applied to the vehicle. For example, in an example, when a load is applied to a driver side of the vehicle, the load can move through a driver side rail, through battery cells, and then to the passenger side rail.

Figure 1:
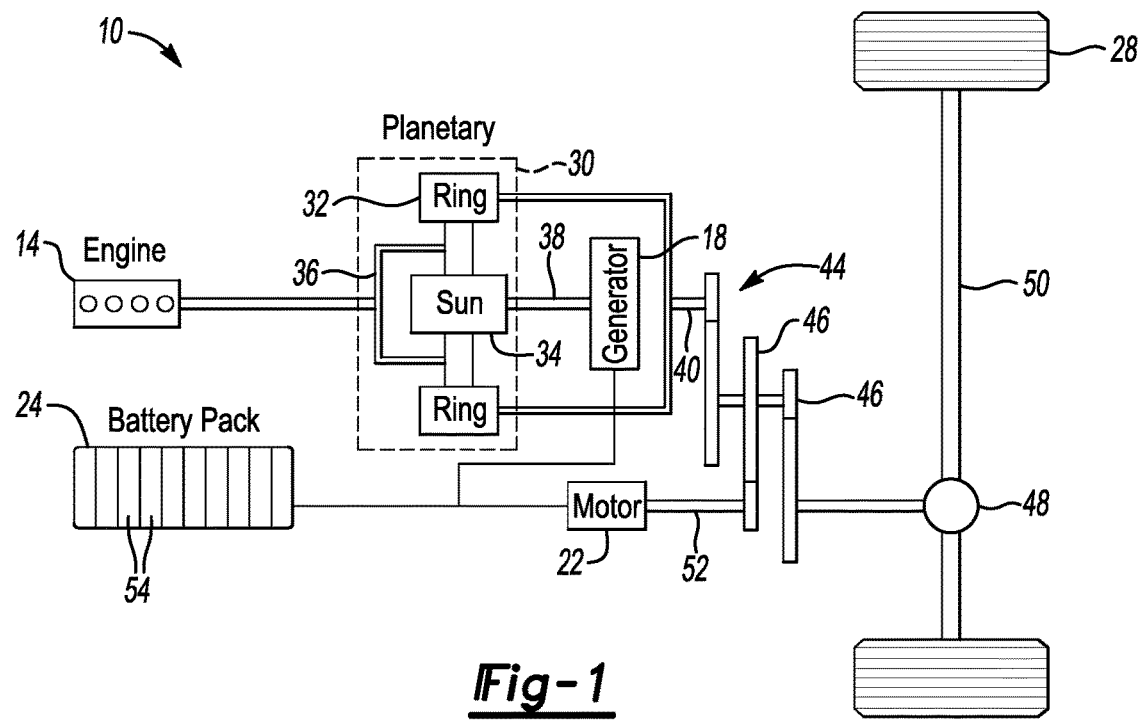
FIG. 1 illustrates a schematic view of a powertrain for an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this teachings of this disclosure extend to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high-voltage traction battery pack that includes a plurality of battery cells 54 (i.e., battery assemblies or groupings of battery cells) capable of outputting electrical power to operate the motor 22, the generator 18, and/or other electrical loads of the electrified vehicle 12 for providing power to propel the drive wheels 28. Other types of energy storage devices and/or output devices could also be used to electrically power the electrified vehicle 12.

Figure 2:
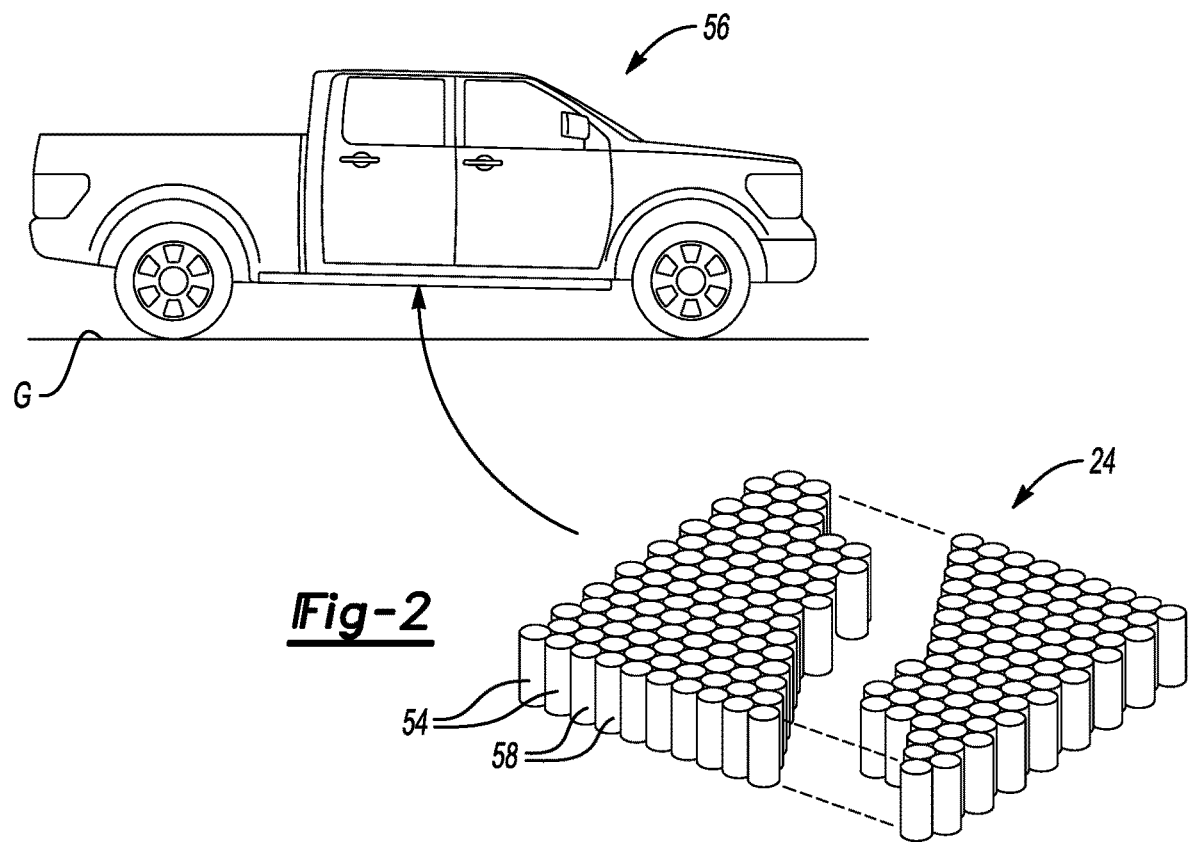
FIG. 2 illustrates the electrified vehicle having the powertrain of FIG. 1 with the traction battery pack according to an exemplary aspect of the present disclosure.

With reference now to FIGS. 2-4, an electrified vehicle 56 includes the powertrain 10. The traction battery pack 24 of the powertrain 10 includes a plurality of individual battery cells 54. The battery cells 54 each include an outer case 58 that is directly secured to an outer case of an adjacent battery cell 54. The outer cases 58 can be a metal or metal alloy. The outer cases 58 of the adjacent battery cells 54 can be welded to each other. In another example, the outer cases 58 can be adhesively secured to each other.

When the battery cells 54 are directly secured to one another as shown in FIG. 2, the battery cells 54 can be moved to the position of FIGS. 3 and 4 where the battery cells 54 are positioned between a first frame rail 62 of the vehicle and an opposite, second frame rail 66 of the electrified vehicle 56. In this example, the first frame rail 62 is a passenger side frame rail and the second frame rail 66 is a driver side frame rail.

The battery cells 54 are arranged in rows that extend from a front-end portion of the vehicle 56 to a rear end portion of the vehicle 56. The rows are generally parallel to a longitudinal axis A of the vehicle 56 in this example. The rows are slightly staggered along the axis A to enable closer packaging of the battery cells 54. This results in the battery cells 54 of the example battery pack 24 having generally a honeycomb pattern.

In this example, the battery cells 54 can each be designated as an inner battery cell 70 or an outer battery cell 72. Inner and outer is with reference to a horizontally central area of the traction battery pack 24.

The outer battery cells 72 extend about a horizontal periphery of the traction battery pack 24. The outer battery cells 72 include the battery cells 54 that are directly secured to the first frame rail 62 or the second frame rail 66. The outer battery cells 72 are also directly secured to adjacent battery cells 54 and, in this example, one or more of the inner battery cells 70.

The inner battery cells 70 are directly secured to adjacent battery cells 54, but are not directly secured to the first frame rail 62 or the second frame rail 66. In this example, the inner battery cells 70 are each directly secured to the outer cases 58 of six other battery cells 54.

While shown as being welded to one another, the battery cells 54, and in another example, could be directly secured to one another by having their outer cases 58 adhesively secured to one another.

The traction battery pack 24, as shown in FIG. 4, can include a busbar 68, support tray 74, and a top cover 78. Mechanical fasteners 82 can extend through the respective frame rail 62 and 66 to connect to the tray 74. Notably, the tray 74, and particularly side walls 86 of the tray, directly contact the associated frame rail 62 and 66. That is, there is no gap between the first frame rail 62 and the wall 86 of the tray on the passenger side or the wall 86 and the second frame rail 66 on the driver side.

The top cover 78 can include a potting material. The busbar 68 can be disposed within the potting material of the top cover 78. The traction battery pack 24 can also include a control module, such as a Battery Energy Control Module (BECM) 90 secured to the top cover 78.

The tray 74 can include a channel 76 utilized to convey a thermal management fluid, such as a coolant, adjacent the battery cells 54 to adjust thermal energy levels within the battery cells 54.

Figure 5:
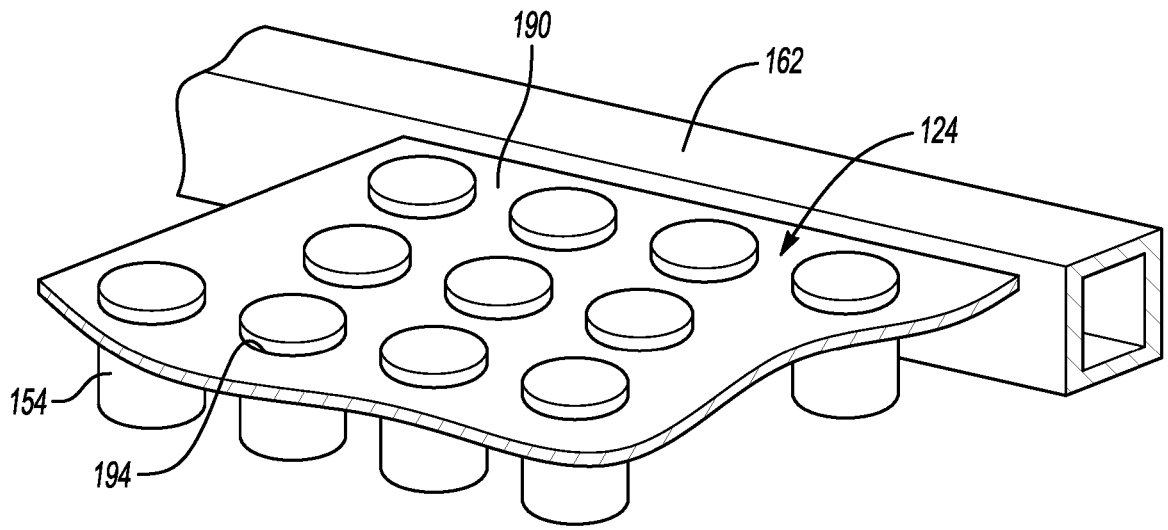
FIG. 5 illustrates a perspective view of a portion of a traction battery pack and a portion of a frame rail according to another exemplary embodiment of the present disclosure.

With reference now to FIG. 5, in another exemplary embodiment, a traction battery pack 124 is secured directly adjacent to a frame rail 162 of an electrified vehicle. The traction battery pack 124 includes a frame assembly 190 defining a plurality of apertures 194 that receive respective battery cells 154. The frame assembly 190 directly contacts the frame rail 162. A load above a threshold value applied to the passenger side of the vehicle having the frame rail 162 can move through the frame rail 162, through the battery cells 154 and the frame assembly 190, to a frame rail on an opposite, second side of the electrified vehicle. The load is transferred through the battery cells 154.

Figure 6:
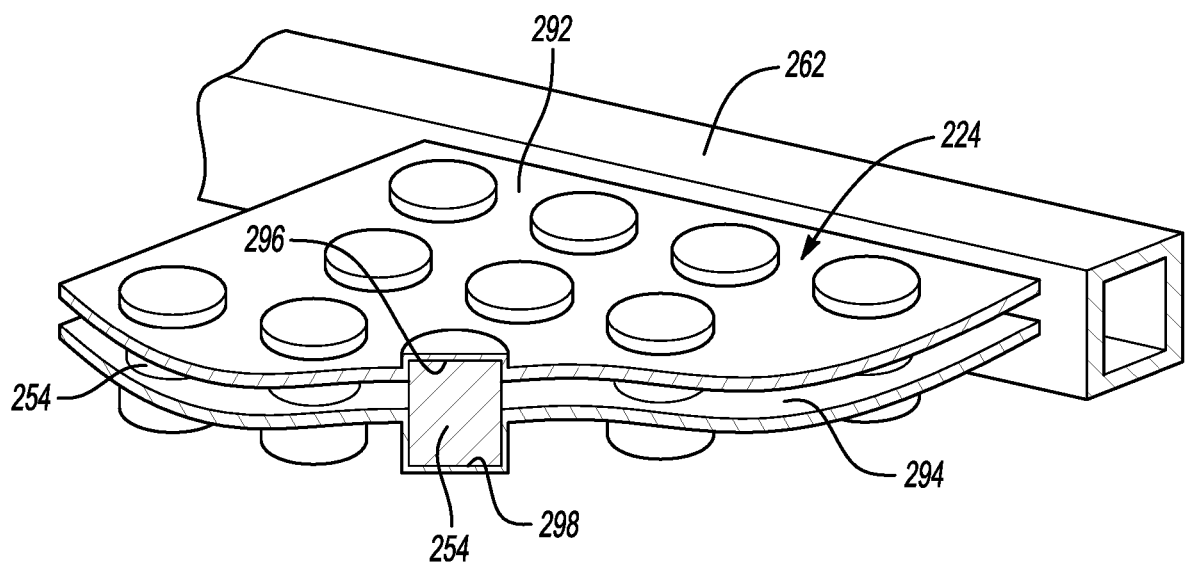
FIG. 6 illustrates a perspective view of a portion of a traction battery pack and a portion of a frame rail according to yet another exemplary embodiment of the present disclosure.

With reference now to FIG. 6, in another exemplary embodiment, a traction battery pack 224 is secured directly adjacent to a frame rail 262 of an electrified vehicle. The traction battery pack 224 is a frame assembly including an upper plate 292 and a lower plate 294. The upper plate provides a plurality of pockets 296 that receive respective first end portions of battery cells 254. The lower plate 294 includes a plurality of pockets 298 that receive opposite, second ends of the respective battery cells 254. The upper plate 292 and the lower plate 294 directly contact the first frame rail 262. A load above a threshold value applied to a passenger side of the vehicle having a first frame rail 262 can move through the frame rail 262, through the battery cells 254 and the plates 292, 294, to a frame rail on an opposite, second side rail of the electrified vehicle. The load is transferred through the battery cells 254.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
    a plurality of battery cells configured to be positioned between a first frame rail of an electrified vehicle and an opposite, second frame rail of the electrified vehicle, the plurality of battery cells arranged to transfer a load from the first frame rail to the second frame rail, wherein each battery cell within the plurality of battery cells comprises an outer case, the outer case of each battery cell within the plurality of battery cells directly secured to at least one outer case of another battery cell within the plurality of battery cells.

2. The traction battery assembly of claim 1, wherein the plurality of battery cells are cylindrical battery cells.

3. The traction battery assembly of claim 1, wherein the plurality of battery cells includes inner battery cells and peripheral battery cells, the inner battery cells having outer cases that are directly secured to the outer cases of at least two other battery cells.

4. The traction battery assembly of claim 3, wherein the plurality of battery cells are cylindrical battery cells.

5. The traction battery assembly of claim 3, wherein the outer cases are a metal or metal alloy.

6. The traction battery assembly of claim 3, wherein the inner battery cells have outer cases that are directly secured to the outer cases of at least six other battery cells within the plurality of battery cells.

7. The traction battery assembly of claim 1, wherein the outer case of each battery cell within the plurality of battery cells is welded to at least one outer case of another battery cell within the plurality of battery cells.

8. The traction battery assembly of claim 1, further comprising a frame assembly having a plurality of apertures, the frame assembly spanning from the first rail to the second rail, each of the apertures within the plurality of apertures holds a respective one of the battery cells within the plurality of battery cells.

9. The traction battery assembly of claim 8, wherein the frame assembly comprises a sheet of material, the plurality of apertures extending from an upper surface of the sheet of material to an opposite, lower surface of the sheet of material.

10. A traction battery assembly, comprising:
    a plurality of battery cells configured to be positioned between a first frame rail of an electrified vehicle and an opposite, second frame rail of the electrified vehicle, the plurality of battery cells arranged to transfer a load from the first frame rail to the second frame rail, and a frame assembly having a plurality of apertures, the frame assembly spanning from the first rail to the second rail, each of the apertures within the plurality of apertures holds a respective one of the battery cells within the plurality of battery cells, the frame assembly includes an upper plate and a lower plate that is spaced from the upper plate, the plurality of apertures are provided by pockets in the upper plate and pockets in the lower plate, wherein an outer case of each battery cell within the plurality of battery cells is welded to at least one outer case of another battery cell within the plurality of battery cells.

11. The traction battery assembly of claim 10, wherein the plurality of battery cells are a plurality of cylindrical battery cells.

12. The traction battery assembly of claim 1, wherein the first frame rail is a passenger side frame rail, wherein the second frame rail is a driver side frame.

13. The traction battery assembly of claim 12, wherein the passenger side frame rail is secured relative to the driver side frame rail without any frame cross-member that overlaps with any of the plurality of battery cells along a longitudinal axis of the electrified vehicle.

14. A method of securing a plurality of battery cells, comprising:
    positioning a plurality of battery cells between a first frame rail of an electrified vehicle and an opposite, second frame rail of the electrified vehicle, the plurality of battery cells positioned to transfer a load from the first frame rail to the second frame rail, wherein the plurality of battery cells are directly secured to one another.

15. The method of claim 14, wherein the plurality of battery cells are cylindrical battery cells.

16. The method of claim 14, wherein the plurality of battery cells are welded to each other.

17. The method of claim 14, wherein the plurality of battery cells each include an outer case, wherein the plurality of battery cells are each held within a respective aperture within a frame assembly, the frame assembly spanning from the first frame rail to the second frame rail, the outer cases of the battery cells within the plurality of battery cells are spaced apart from one another when the plurality of battery cells are held within the frame assembly.

\* \* \* \* \*